Oct. 12, 1965  W. L. HUSKO  3,211,494
HINGE STOP
Filed March 19, 1962  3 Sheets-Sheet 1

INVENTOR.
Waino L. Husko
BY
S. C. Thorpe
ATTORNEY

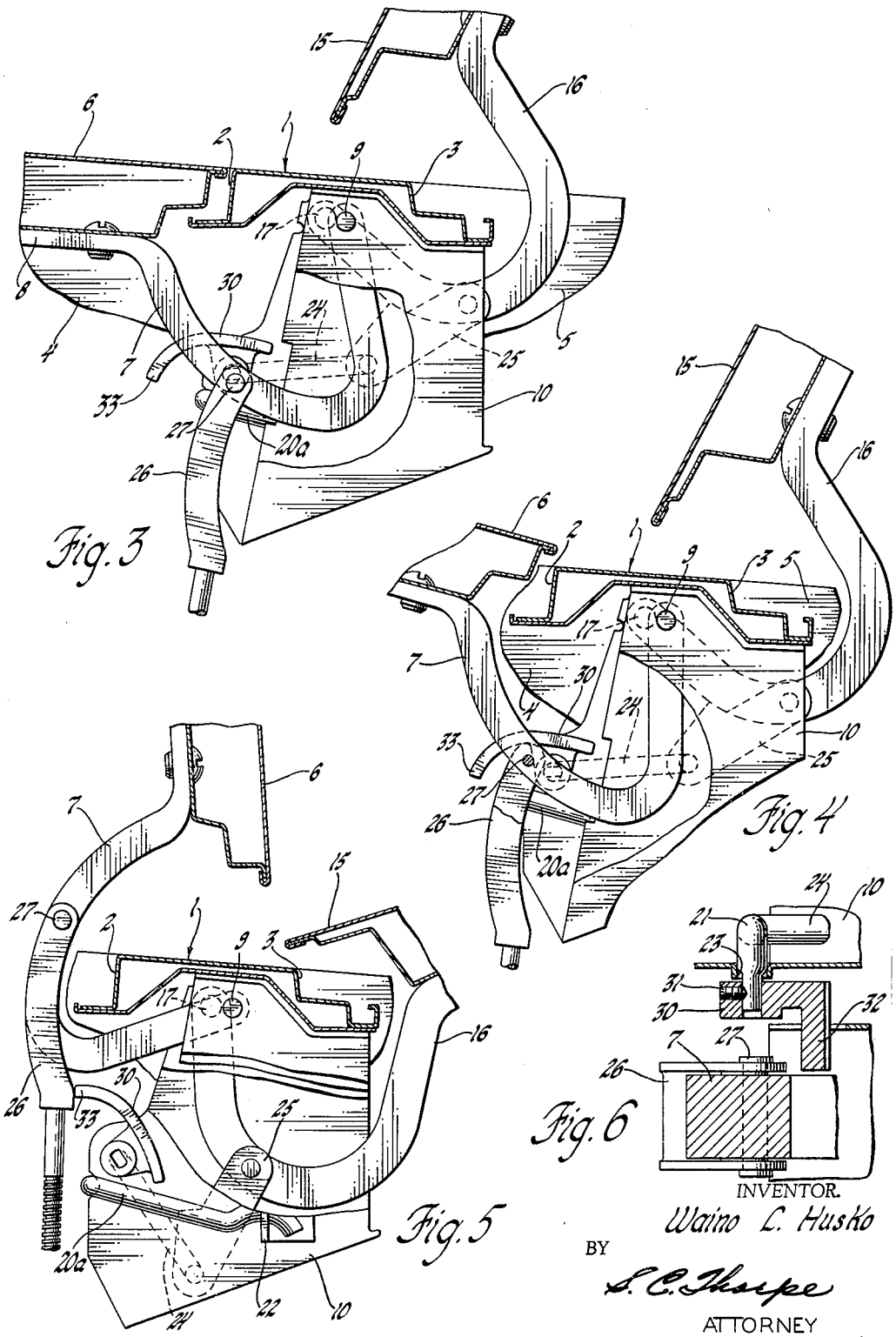

Oct. 12, 1965

W. L. HUSKO 3,211,494

HINGE STOP

Filed March 19, 1962

INVENTOR.
Waino L. Husko
BY
S. C. Thorpe
ATTORNEY

United States Patent Office 3,211,494
Patented Oct. 12, 1965

3,211,494
HINGE STOP
Waino L. Husko, Detroit, Mich., assignor to General Motors Corporation, Detroit, Mich., a corporation of Delaware
Filed Mar. 19, 1962, Ser. No. 180,531
5 Claims. (Cl. 296—76)

This invention relates to automotive vehicle bodies having adjacent closure members which are hinged to open toward each other, as for example luggage compartment deck lids and convertible top stowage well covers, and more particularly to hinge stop means therefor preventing simultaneous opening of both such covers and consequent interference therebetween.

It is conventional practice to counterbalance the relatively heavy luggage compartment lid with one or more torsion rod springs extending transversely of the vehicle body, and I have found that such torsion rod springs may be conveniently adapted for movably positioning a stop element for interengagement with a second stop element movable with the hinge of the other cover so that when one cover is in open position the other cover is prevented from being moved into interference therewith, and vice versa. In those vehicles in which the other mentioned cover is power actuated, and for such purpose has a clevis or like power actuated member linked to its hinge arm, such hinge actuating member may conveniently serve as the stop element associated with the hinge of that cover.

A clearer understanding of the invention will be had from the following description of two preferred embodiments, having reference to the drawings wherein:

FIGURE 3 is a view similar to FIGURE 2 but with the luggage compartment cover shown in open position, the top well cover being fully closed.

FIGURE 4 is a view similar to FIGURE 3 but showing the top well cover partially raised to a position in which further opening thereof is blocked by my hinge stop.

FIGURE 5 is a similar view, showing the reverse relation of the covers from that of FIGURE 4, in which the top well cover is in open position and opening of the luggage compartment cover is arrested by the hinge stop.

FIGURE 6 is a further enlarged sectional view, taken substantially along the line 6—6 of FIGURE 2 and showing the details of attachment of the hinge stop element to the counterbalance spring of the luggage compartment cover.

Figure 7:
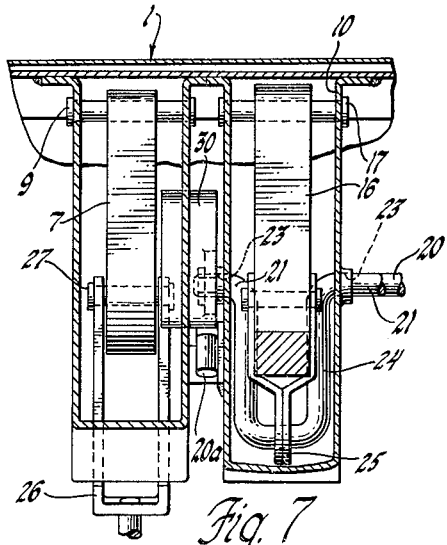
FIGURE 7 is a sectional view taken substantially along the line 7—7 of FIGURE 2.
Figure 9:
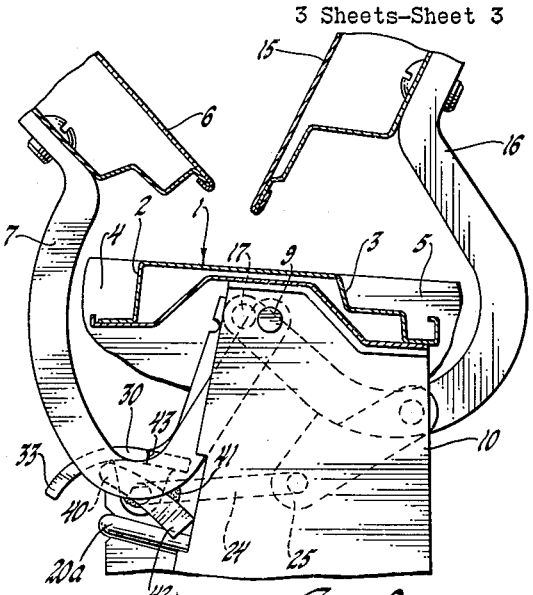
Figure 8:
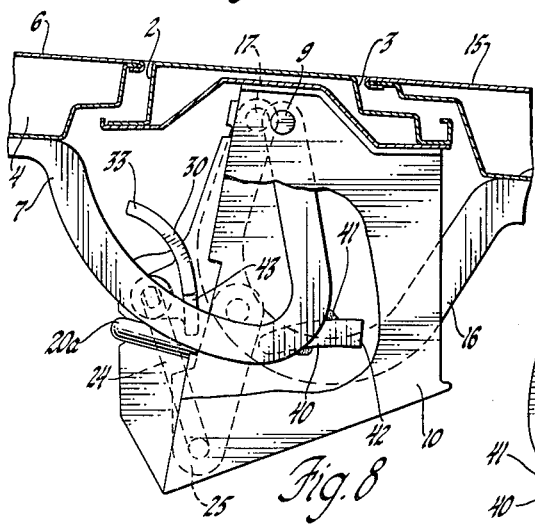
FIGURE 8 is a view similar to FIGURE 2, but showing a modified form of the invention.
Figure 10:
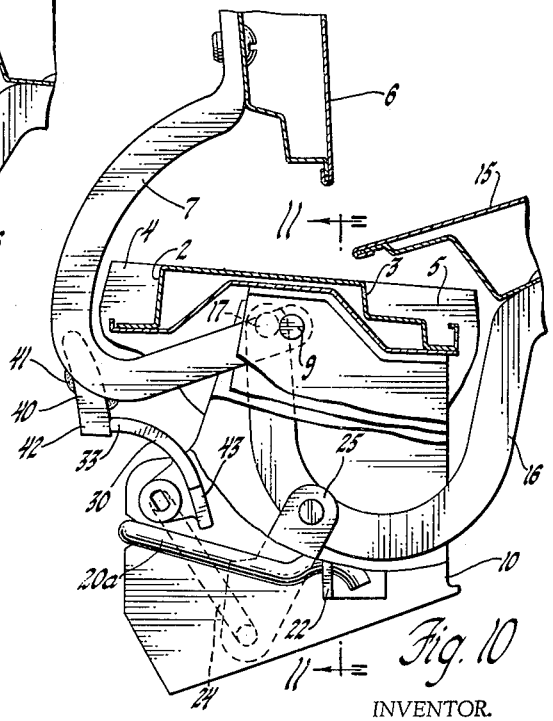
Figure 11:
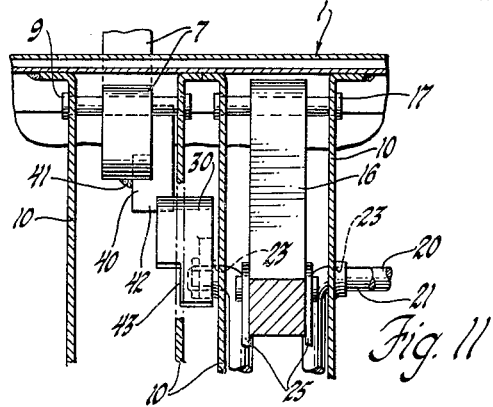

FIGURES 9, 10 and 11 are views similar to FIGURES 4, 5 and 7, but showing the last mentioned modified form, FIGURE 11 being taken substantially along the line 11—11 of FIGURE 10.

Referring now in detail to the drawings and particularly to FIGURES 1–7, an automobile body 1 of the convertible type has a rear deck with openings 2 and 3 therein for access to a stowage well 4 for the convertible top (not shown), and to the trunk or luggage compartment 5, respectively. Serving as a closure for the top well 4 is a cover 6 which is swingable upwardly and rearwardly from its position shown in FIGURE 2 to its open position shown in FIGURE 5. Connecting the cover 6 to the body 1 are a pair of concealed-type, goose-neck shaped hinge arms 7 whose forward ends 8 are secured to the underside of the cover and have their rearward ends journaled as by pins 9 in a hinge box or support 10 suitably mounted within the body intermediate the openings 2 and 3. Opening of the well cover 6 may be effected by a suitable motor (not shown) linked to one or both the hinge arms 7 through a conventional clevis 26. As shown, the upper end of this clevis is pinned at 27 to the hinge 7 for pivotal movement with the hinge during opening and closing movements of the cover.

Figure 1:
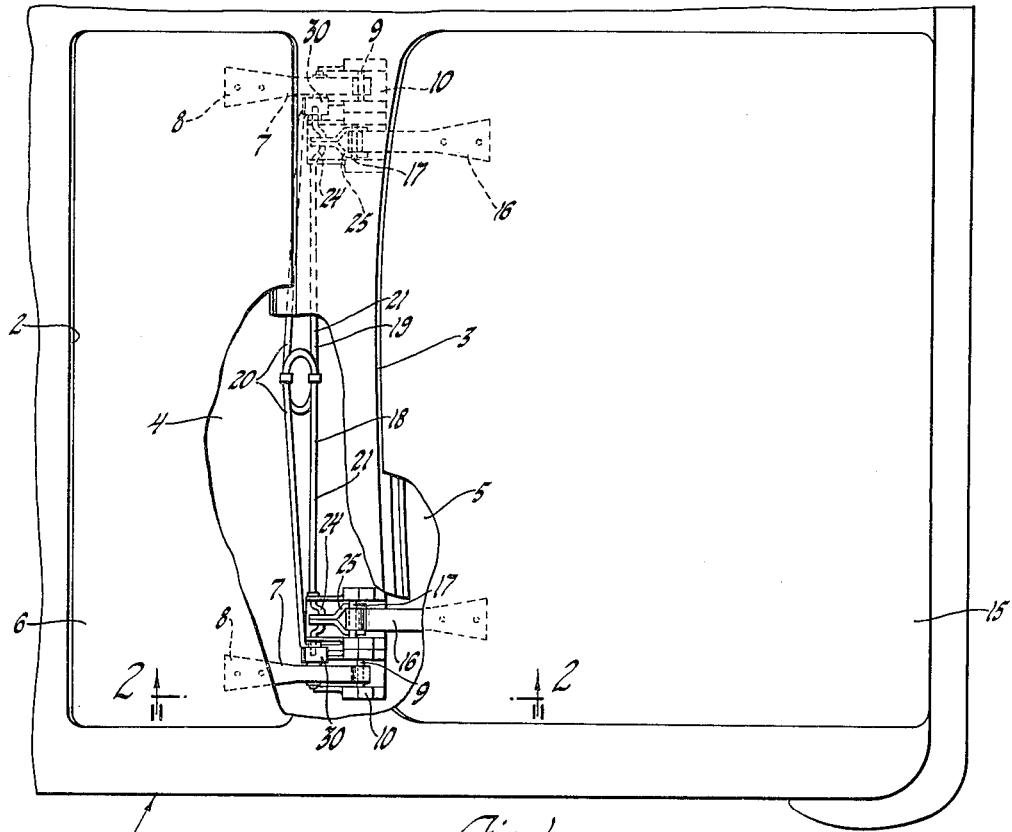
FIGURE 1 is a plan view of the rear deck portion of an automobile body of the convertible type, with parts broken away to show the hinging at one side thereof for the luggage compartment deck lid and its forwardly adjacent top well cover, and stop means therefor.
Figure 2:
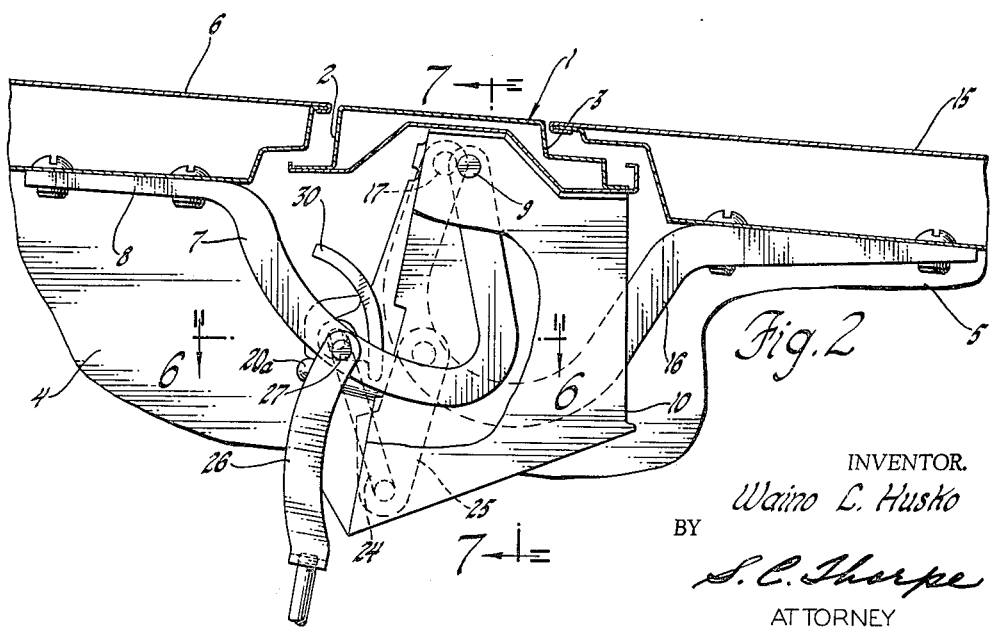
FIGURE 2 is an enlarged fragmentary sectional view taken substantially along the line 2—2 of FIGURE 1, both covers being shown in closed position.

The cover for the luggage compartment 5 is designated 15 and is similarly hinged by like arms 16 to pins 17 in the support 10, so that during opening movement from its position shown in FIGURE 2 to that of FIGURES 3 and 4 it swings upwardly and forwardly of the vehicle. Suitable counter-balancing of the weight of this cover 15 provided in the form of one or more (two being shown) torsion rod springs 18 and 19. The particular springs 18 and 19 illustrated are the same as disclosed in Ragsdale U.S. Patent No. 2,799,891, being generally U-shape in configuration and extending transversely of the vehicle. One arm 20 of each spring has its outboard end 20a anchored to a lug 22 on the hinge support 10 as best shown in FIGURE 5, and its other arm 21 is journaled for rotation in openings 23 in the hinge support 10, on opposite sides of the adjacent hinge arm 16 as best shown in FIGURE 7. Between these journaling openings 23 the torque rod is provided with a crank portion 24 extending radially from the axis of the journaled arm 21 and in the plane of swinging movement of the hinge arm 16. Each of these crank portions is drivingly connected to its hinge 16 by a link 25, so that during closing of the cover 15 each torque rod 18 and 19 is torsionally stressed.

As best seen in FIGURE 6 a hinge stop element 30 is suitably fixed, as by a set screw 31, to the outboard end of the spring arm 21 adjacent the crank portion 24. This element extends toward the adjacent hinge 7 of the top well cover 6 and terminates with a projection 32 which extends parallel to and in the path of movement of the upper end of the clevis 26.

During operation, when both covers 6 and 15 are in their closed positions shown in FIGURE 2, either of the covers may be raised to its full open position FIGURES 5 and 6, respectively. Assuming the luggage compartment cover 15 is first opened to its position shown in FIGURES 3 and 4, opening of the top well cover 6 is prevented by the stop element 30 on the torsion rod spring being in blocking relation with the upper end of the clevis 26 (FIGURE 4). Likewise, after first opening the top well cover 6 to its position shown in FIGURE 5, opening of the cover 15 is prevented by engagement of the extended end 33 of the stop element 30 with the lower end of the clevis 26. Thus, the arrangement described insures against either cover being opened and damaging the external surface thereof by interference with that of the other cover in open position.

In the modified form of the invention shown in FIGURES 8–11 wherein the top well cover 6 is not power actuated, and hence has no clevis connected to its hinge 7, a substitute stop element 40 is fixed as by welding at 41 to the hinge arm 7. This stop element 40 extends into the path of movement of the torque rod connected stop element 30, and is of sufficient length that its lower end 42 is in blocking relation with the end 33 of the element 30 during opening movement of the cover 15 toward the already opened top well cover 6 (FIGURE 10). Conversely, as shown in FIGURE 9, with the luggage compartment cover 15 in open position, opening movement of the top well cover 6 is limited to prevent its interference with the cover 15 by interengagement of the opposite end 42 of the element 40. To accommodate movement of the element 40 past the element 30 during opening of the top well cover 6 while the luggage compartment cover 15 is in closed position, the lower portion of the element 30 facing the element 40 is notched as best seen at 43 in FIGURE 11. The two stop elements otherwise function in the same manner as previously described in the case of the power actuated top well cover having the hinge actuating arm 26 serving as one of the stop elements.

Although only two embodiments of the invention have been illustrated and described, it is appreciated that minor changes and rearrangements of the various elements may be made without departing from the spirit and scope of the invention as hereinafter claimed.

I claim:

1. In combination with an automotive vehicle body having a luggage compartment and a convertible top stowage well adjacent thereto, each with a hinged cover swingable upwardly to open position about an axis adjacent the side thereof nearest the other cover, a movable hinge arm secured to each cover, a pivotal support for each said hinge arm, a torsion rod counterbalance spring for one of said covers extending generally normal to the plane of swinging movement of its hinge arm, said spring having a crank portion drivingly connected to said last named hinge arm and rotatably journaled by said support, said hinge arm of the other cover and said crank portion each having an element movable therewith during opening of its cover from a position out of the path of opening movement of the other element with its cover to a position within said path and in blocking relation to said other element.

2. In combination with an automotive vehicle body having a luggage compartment and a convertible top stowage well adjacent thereto, each with a hinged cover swingable upwardly to open position about an axis adjacent the side thereof nearest the other cover, a movable hinge arm secured to each cover, a pivotal support for each said hinge arm, said hinge arms being laterally adjacent each other, one of said hinge arms having a counterbalance spring with an axially rotatable portion drivingly connected to said one hinge arm and extending generally normal to its plane of hinging movement, a hinge actuating element connected to the other of said hinge arms, and an element rotatable with said spring portion, said elements each being located for movement in response to opening of its associated hinged cover from a position out of to a position within the path of and blocking opening movement of the other element with its cover, whereby when either of said covers is in open position the other cover is prevented from being opened into abutment with said open cover.

3. In combination with an automotive vehicle body having a luggage compartment and a convertible top stowage well adjacent thereto, each with a hinged cover swingable upwardly to open position about an axis adjacent the side thereof nearest the other cover, a goose-neck shaped hinge arm secured at one end to the underside of said luggage compartment cover and a similarly shaped hinge arm secured at one end to the underside of said well cover, pivotal supports for the opposite ends of said hinge arms within the body intermediate said compartment and well, said hinge arms being located adjacent each other for swinging movement in parallel planes, a torsion rod counterbalance spring for said compartment cover having a crank portion rotatable in the plane of movement of and drivingly connected to said compartment cover hinge arm, an elongated element fixed to said spring adjacent said crank portion and extending both normal to its axis of rotation and axially thereof into the path of movement of said well cover hinge arm, said well cover hinge arm having an elongated element connected thereto and movable in the path of movement of said crank portion element during opening and closing of the well cover, the length and direction of elongation of said elements being such that when either of the covers is in open position the element movably associated with the hinge arm of the open cover is in blocking relation to movement of the other hinge associated element to its cover open position.

4. In combination with an automotive vehicle body having a luggage compartment and a convertible top stowage well adjacent thereto, each with a hinged cover swingable upwardly to open position about an axis adjacent the side thereof nearest the other cover, a movable hinge arm secured to each cover, one of said hinge arms being of the goose-neck shaped, concealed type having its hinge axis below the external surface of the covers in closed position, a pivotal support for each said hinge arm, one of said covers having a counterbalance spring in the form of a torsion rod extending generally normal to the plane of swinging movement of said one cover, said rod having a crank portion extending in the plane of the hinge arm secured to said one cover, and a link pivotally connected at its respective ends to said crank portion and to said last named hinge arm at a distance from the hinge axis thereof, said crank portion and the hinge arm of the other of said covers each having an element movable therewith during opening of its respective cover from a position out of the path of opening movement of the other element with its cover to a position within said path and blocking opening movement of said other element, said spring portion element extending axially of the rod into the path of movement of said hinge arm element and terminating within said path with a projection, whereby said projection is in movement blocking relation to said hinge arm element when said one cover is open and the other said cover is closed, and said hinge arm element is in movement blocking relation to the extended end of said projection when said other cover is open and said one cover is closed.

5. The invention of claim 4, wherein the other of said hinge arms is also of the goose-neck shaped, concealed type having its pivotal axis below the external surface of the covers in closed position, and said hinge arm element is fixed rigidly to the hinge arm of said other cover and has an end extending into blocking relation with said projection when said other cover is open and said one cover is closed.

References Cited by the Examiner

UNITED STATES PATENTS

| | | | |
|---|---|---|---|
| 2,007,873 | 7/35 | Paulin | 296—107 X |
| 2,799,891 | 7/57 | Ragsdale | 16—180 |
| 2,800,361 | 7/57 | Kubacka | 296—76 |

FOREIGN PATENTS 26,416　1909　Great Britain.

A. HARRY LEVY, *Primary Examiner.*